(12) United States Patent
Cacioppo

(10) Patent No.: US 12,153,429 B2
(45) Date of Patent: Nov. 26, 2024

(54) SYSTEMS AND METHODS FOR DYNAMIC REPOSITIONING OF INVENTORY

(71) Applicant: Ocado Innovation Limited, Hatfield (GB)

(72) Inventor: Christopher Cacioppo, Somerville, MA (US)

(73) Assignee: Ocado Innovation Limited, Hatfield (GB)

(*) Notice: Subject to any disclaimer, the term of this patent is extended or adjusted under 35 U.S.C. 154(b) by 208 days.

(21) Appl. No.: 17/111,947

(22) Filed: Dec. 4, 2020

(65) Prior Publication Data

US 2022/0179416 A1    Jun. 9, 2022

(51) Int. Cl.
| | |
|---|---|
| *G06Q 10/08* | (2024.01) |
| *G01C 21/34* | (2006.01) |
| *G05D 1/00* | (2006.01) |
| *G06Q 10/087* | (2023.01) |
| *H04W 4/02* | (2018.01) |

(52) U.S. Cl.
CPC ....... *G05D 1/0088* (2013.01); *G01C 21/3415* (2013.01); *G05D 1/0212* (2013.01); *G06Q 10/087* (2013.01); *H04W 4/02* (2013.01)

(58) Field of Classification Search
CPC ............. G01C 21/3415; G05D 1/0088; G05D 1/0212; G05D 2201/0213; G06Q 10/087; H04W 4/02; H04W 4/024; H04W 4/029; H04W 4/40
See application file for complete search history.

(56) References Cited

U.S. PATENT DOCUMENTS

| | | | |
|---|---|---|---|
| 9,834,380 B2 | 12/2017 | Hamilton et al. | |
| 10,310,500 B1* | 6/2019 | Brady | G05D 1/0291 |
| 2003/0222762 A1* | 12/2003 | Beigl | G06K 17/00 |
| | | | 705/22 |
| 2007/0094101 A1* | 4/2007 | Breitling | G06Q 10/08 |
| | | | 705/28 |

(Continued)

OTHER PUBLICATIONS

Canadian Intellectual Property Office, "Office Action," issued in connection with Canadian Patent Application No. 3,137,601, Oct. 24, 2023, 6 pages.

(Continued)

*Primary Examiner* — Matthew J. Reda
(74) *Attorney, Agent, or Firm* — Hanley, Flight & Zimmerman, LLC

(57) ABSTRACT

Disclosed herein are systems and methods for dynamically repositioning inventory items in a space. The exemplary systems may be configured to receive a signal indicating a change in demand for a product, in which a plurality of items of the product are positioned at a first location within the space. The systems may be configured to determine a second location within the space for positioning at least some items such that a collection time is reduced. The systems may be further configured to generate a route for an autonomous vehicle that includes the first and second locations, as well as a third location where an item for an order is positioned. The systems may then trigger navigation of the autonomous vehicle, based on the route, to reposition the items from the first location to the second location and to collect the item for the order.

23 Claims, 7 Drawing Sheets

(56) References Cited

U.S. PATENT DOCUMENTS

| | | | |
|---|---|---|---|
| 2012/0130761 A1* | 5/2012 | Mohan | G06Q 10/0631 |
| | | | 705/7.12 |
| 2016/0253908 A1* | 9/2016 | Chambers | G08G 5/006 |
| | | | 701/2 |
| 2017/0225891 A1* | 8/2017 | Elazary | B65G 1/1375 |
| 2018/0127212 A1* | 5/2018 | Jarvis | B66F 9/06 |
| 2020/0207250 A1* | 7/2020 | Jarvis | G06Q 50/28 |
| 2020/0301432 A1* | 9/2020 | Bose | G06Q 10/087 |

OTHER PUBLICATIONS

Canadian Intellectual Property Office, "Office Action," issued in connection with Canadian Patent Application No. 3,137,601, Aug. 23, 2024, 4 pages.

* cited by examiner

SYSTEMS AND METHODS FOR DYNAMIC REPOSITIONING OF INVENTORY

TECHNICAL FIELD

The following disclosure is directed to systems and methods for inventory management and order collection by autonomous vehicles and, more specifically, systems and methods for dynamic repositioning of inventory with autonomous vehicles.

BACKGROUND

Inventory management systems are typically configured to manage customer orders for products in a warehouse or a store. Warehouses can be arranged such that human pickers and/or autonomous vehicles can access and collect items for orders in an efficient manner. Customer orders can include orders by individual purchasers with single-packaged items or orders by businesses with bulk packaged items (e.g., multiple items packaged together).

SUMMARY

In one aspect, the disclosure features a computing system for dynamically repositioning inventory items in a space. The computing system can include a communication device configured to receive a signal indicating a change in demand for a product, wherein a plurality of items of the product are positioned at a first location within the space; and at least one processor in communication with the communication device. The processor can be configured to: determine a second location within the space for positioning at least a sub-plurality of the items such that a collection time is reduced, in which the second location is different from the first location and in which the collection time is a time that an autonomous vehicle requires to collect an item of the product. The processor can be further configured to: generate a route for at least one autonomous vehicle that includes the first location and the second location, in which the route further includes a third location where at least one item of an order is positioned; and trigger navigation of the at least one autonomous vehicle, based on the route, for repositioning the sub-plurality of items from the first location to the second location and for collecting the at least one item for the order.

Various embodiments of the computing system can include one or more of the following features.

The processor can be further configured to: determine the collection time when the plurality of items of the product are located in the first location based on at least one of: (i) a congestion level at the first location; (ii) a degree to which an item of another product is collected for a customer order, the customer order including an item of the product; or (iii) a collection frequency of an item of the product at the first location. When determining the collection time is based on the congestion level at the first location, then the at least one processor is further configured to: compare an average congestion level of the first location to an average congestion level of at least one other location in the space, the at least one other location in the space comprising the second location. The congestion level at the first location can depend, at least in part, upon at least one of: (i) a number of autonomous vehicles near or at the first location at a given time or (ii) a number of workers near or at the first location at the given time. The congestion level at the first location can be a predicted congestion level and wherein the congestion level at the first location depends, at least in part, upon at least one of: (i) a predicted number of autonomous vehicles near or at the first location at a future time or (ii) a predicted number of workers near or at the first location at the future time.

The third location can be different from both the first location and the second location. The third location can be the same as the first location or the second location. The computing system is a remote computing system configured to communicate with a plurality of autonomous vehicles configured to carry the sub-plurality of items, the plurality of autonomous vehicles comprising the at least one autonomous vehicle. The communication device can be further configured to instruct the at least one autonomous vehicle to carry the at least one item for the order in a container separate from a container holding the sub-plurality of items. The processor can be further configured to determine the second location such that a congestion level of autonomous vehicles collection time is initially less at the second location as compared to the collection time of the first location. The communication device can be further configured to receive, prior to generating the route for the at least one autonomous vehicle, a signal indicating reception of the order from a customer.

In another aspect, the disclosure features a computer-implemented method for dynamically repositioning inventory items in a space. The method can include receiving a signal indicating a change in demand for a product, in which a plurality of items of the product are positioned at a first location within the space; and determining a second location within the space for positioning at least a sub-plurality of the items such that a collection time is reduced, in which the second location is different from the first location and in which the collection time is a time that an autonomous vehicle requires to collect an item of the product. The method can include generating a route for at least one autonomous vehicle that includes the first location and the second location, in which the route further includes a third location where at least one item of an order is positioned; and triggering navigation of the at least one autonomous vehicle, based on the route, for repositioning the sub-plurality of items from the first location to the second location and for collecting the at least one item for the order.

Various embodiments of the computer-implemented method can include one or more of the following features.

Determining the collection time when the plurality of items of the product are located in the first location based on at least one of: (i) a congestion level at the first location; (ii) a degree to which an item of another product is collected for a customer order, the customer order including an item of the product; or (iii) a collection frequency of an item of the product at the first location. When determining the collection time is based on the congestion level at the first location, the method can further include comparing an average congestion level of the first location to an average congestion level of at least one other location in the space, the at least one other location in the space comprising the second location.

The congestion level at the first location can depend, at least in part, upon at least one of: (i) a number of autonomous vehicles near or at the first location at a given time or (ii) a number of workers near or at the first location at the given time. The congestion level at the first location can be a predicted congestion level and wherein the congestion level at the first location depends, at least in part, upon at least one of: (i) a predicted number of autonomous vehicles near or at the first location at a future time or (ii) a predicted number of workers near or at the first location at the future time. The third location can be different from both the first location and the second location. The third location can be the same as the first location or the second location. The method can be executed by a computing system configured to communicate with a plurality of autonomous vehicles configured to carry the sub-plurality of items, the plurality of autonomous vehicles comprising the at least one autonomous vehicle. The method can include instructing the at least one autonomous vehicle to carry the at least one item for the order in a container separate from a container holding the sub-plurality of items. The second location can be determined such that a congestion level of autonomous vehicles is initially less at the second location as compared to the collection time of the first location.

In another aspect, the disclosure features a non-transitory computer-readable medium having instructions stored thereon that, when executed by at least one computer processor, cause the at least one computer processor to perform operations that can include receiving a signal indicating a change in demand for a product, wherein a plurality of items of the product are positioned at a first location within a space; and determining a second location within the space for positioning at least a sub-plurality of the items such that a congestion level is reduced at the first location collection time is reduced, wherein the second location is different from the first location and wherein the collection time is a time that an autonomous vehicle requires to collect an item of the product. The operations can include generating a route for at least one autonomous vehicle that includes the first location and the second location, wherein the route further includes a third location where at least one item of an order is positioned; and triggering navigation of the at least one autonomous vehicle, based on the route, for repositioning the sub-plurality of items from the first location to the second location and for collecting the at least one item for the order.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the systems and methods described herein. In the following description, various embodiments are described with reference to the following drawings.

DETAILED DESCRIPTION

Figure 1A:
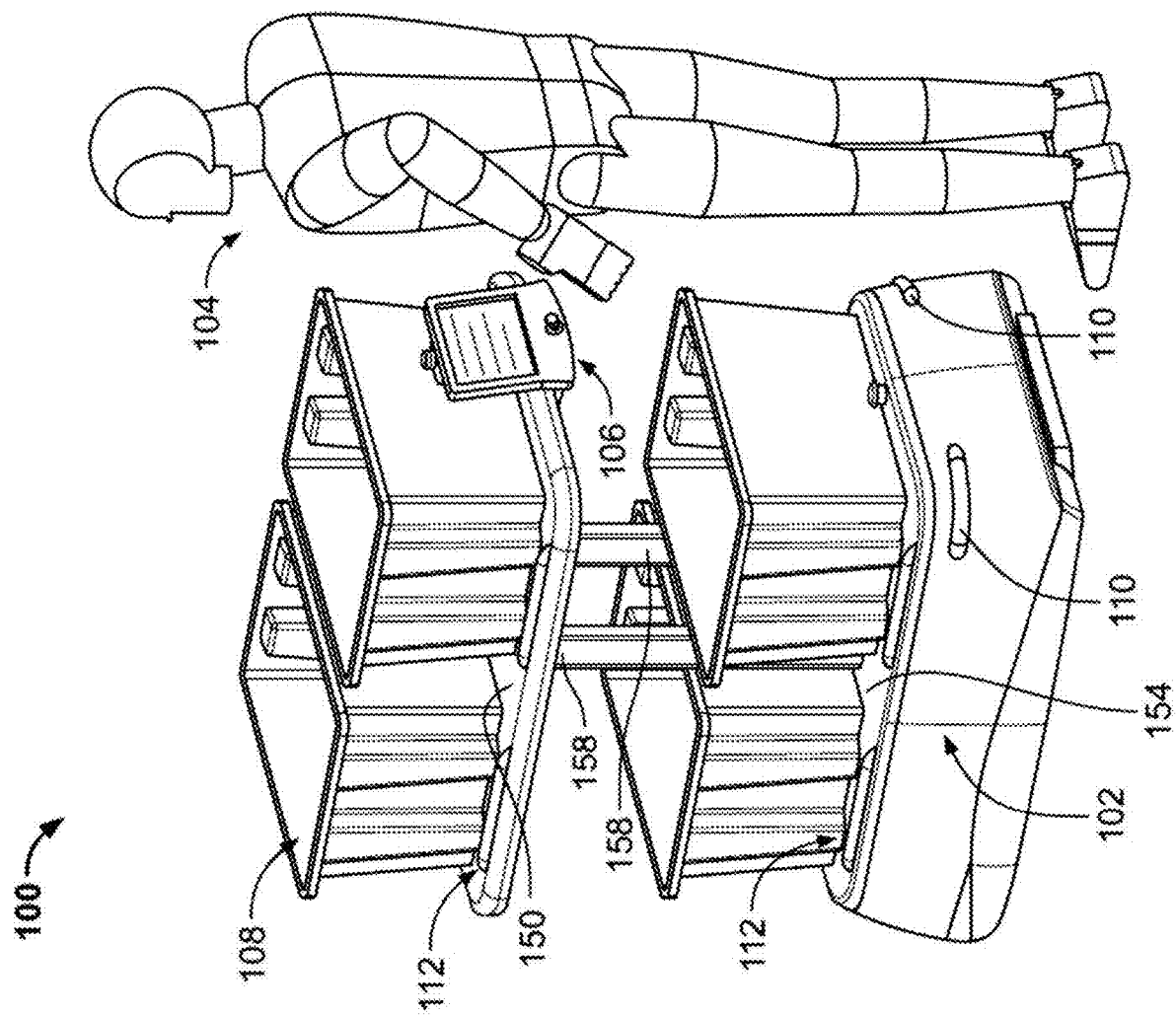
FIG. 1A is a model of an embodiment of an autonomous vehicle configured to collect items for orders.

Described herein are exemplary systems and methods for dynamic repositioning of inventory with autonomous vehicles. In a storage environment (e.g., a warehouse, a storehouse, a depot, a repository, a retail store, a grocery store, etc.), an autonomous vehicle can be tasked with collecting items distributed in various locations for an order (e.g., a customer order). A computing system (e.g., a computing system internal and/or external to the autonomous vehicle) can determine a path in the storage environment for the autonomous vehicle to collect each of the items for a given order. A controller of the autonomous vehicle can navigate the vehicle through an optimized sequence of locations within the warehouse such that a worker (also referred to as a picker or an associate) can physically place the item into a container (also referred to as a tote) for the vehicle to carry.

As demand changes (e.g., increases or decreases) for one or more items, vehicle and/or worker traffic within a space (e.g., a portion of a warehouse floor, retail floor, grocery store, etc.) may change accordingly. For instance, one or more particular locations in a warehouse may be congested due to increased vehicle and/or worker traffic. The underlying reason for the congestion may be a high-demand item at that location. For example, certain inventory items in a warehouse may be included in many customer orders due to external factors including, e.g., weather, seasonality, sales, discounts, or a change in consumer demand. Congestion concentrated around high-demand inventory can cause inefficiencies by slowing down the operation of a warehouse, e.g., by delaying the collection of items for orders and even causing warehouse shutdowns.

In conventional warehouse operations, high-demand inventory items may be placed together and/or near locations where the items would be packed for delivery outside the warehouse. By placing items near a packing station, the distance walked by human pickers can be reduced. Typically, the positioning (also referred to as slotting) of these items in a warehouse is based on demand data associated with the items as they are initially shelved or periodic reviews of demand data. Conventional optimization engines may rely on a static slotting map with static starting positions of products and pickers. Conventional repositioning (also referred to as re-slotting) of items may require the shutting down of the warehouse, which hinders productivity and efficiency in fulfilling orders.

In an automated warehouse environment, high-demand inventory items can be repositioned such that the autonomous vehicles are operated more efficiently, with optimized routes, and/or without disrupting warehouse operations. For example, this may be achieved by distributing high-demand items throughout a warehouse, e.g., with a particular distance in between items or along particular routes of the autonomous vehicles.

In some embodiments, the high-demand items can be dynamically repositioned by autonomous vehicles during the regular course of fulfilling orders. For example, high-demand items of a particular type (e.g., assigned a particular stock keeping unit (SKU)) can be picked up by an autonomous vehicle in a first container at one location and moved to one or more locations in the warehouse. The same vehicle may also be picking up items for a customer order in a second container.

In some embodiments, items may be dynamically repositioned based on the likelihood that an item of a first product is picked in the same order as an item of a second product. For example, the first product (e.g., peanut butter) and the second product (e.g., jelly) may often be picked together in a customer. In another example, a first product may be the primary product (e.g., winter coat) in an order and may be picked frequently with a secondary product (e.g., winter hat). Accordingly, items of a first product may be repositioned to be closer to items of a second product. This may be based on the season, changing consumer tastes, etc.

In some embodiments, items may be dynamically positioned based on the picking frequency of an item of the product. For example, a particular product (e.g., toilet paper) may included in most customer orders. Therefore, items of these popular products may need to be repositioned to improve the ability of vehicles to collect them for orders.

The repositioning of items may be based on real-time or near real-time data reflecting the demand of various items. For example, incoming orders of items and/or predictions of future increased demand for a particular item type can trigger repositioning of the items. In some instances, a computing system can process the orders that will be picked in a given time period (e.g., an hour, a half day, a day, a week, a month, etc.) and integrate commands for repositioning of items in the planned order fulfillment activities of that time period. In some embodiments, the system is configured to determine the cost (or, alternatively or additionally, the benefit) associated with repositioning the items. In some cases, one reason to determine such a cost is that too frequent repositioning may be counter-production, costly, or inefficient to the productivity of the warehouse. The cost of repositioning the items may include the time a vehicle is occupied with the repositioning task as compared to picking for customer orders. For example, if the cost associated with repositioning is twice, three times, or more than the cost associated with picking, then the repositioning task may need to be scheduled at a reduced frequency compared to the picking task. In some cases, the repositioning task may be scheduled in proportion to its cost relative to the picking task. For example, if a repositioning task is 12 times as costly as a picking task, then the repositioning task may be scheduled up to 12 times as frequent as a picking task. In other instances, the computing system can analyze demand data to integrate commands for repositioning of items as the data changes. In some instances, if the increased demand for an item is transitory, then the item may be repositioned for a period of time, e.g., until the items are depleted, need to be replenished, or before being repositioned for average demand.

Advantages of the example systems and methods described herein include reduction of congestion among autonomous vehicles and/or workers in a space (e.g., warehouse floor, retail store floor, grocery store, etc.) and/or reduction in time required to pick items for customer orders. Note that, in some embodiments, items of high-demand products do not necessarily need to be placed near packing stations as autonomous vehicle travel does not necessarily need to be minimized (e.g., in comparison to carts that are physically pushed or pulled by human pickers who may tire from physically moving the carts and from walking longer distances). If there are two or more products in high demand, it can be desirable to distribute the locations of the products throughout a warehouse to operate with high efficiency and/or low congestion. Therefore, in some cases, the exemplary systems and methods can increase the overall efficiency of inventory management, warehouse operations, meeting customer demands, etc.

The technology described herein may be employed in mobile carts of the type described in, for example, U.S. Pat. No. 9,834,380, issued Dec. 5, 2017 and titled "Warehouse Automation Systems and Methods," the entirety of which is incorporated herein by reference and described in part below.

Exemplary Application to Autonomous Warehouse Carts

FIG. 1A depicts an enhanced cart system 100 including an enhanced cart 102 (e.g., an autonomous vehicle). As illustrated, one or more enhanced carts, often referred to in the industry as picking carts, can work alongside one or more warehouse workers 104 (also referred to as associates) to move inventory items around a warehouse. The enhanced carts 102 are intended to assist in most warehouse tasks, such as picking, re-stocking, moving, sorting, counting, or verifying items (e.g., products). These carts 102 can display information to the associate 104 through the use of a user interface (e.g., screen) 106 and/or onboard visual and/or audible indicators that improve the performance of the associates 104. The cart 102 can be propelled by a motor (e.g., an electric motor) that is coupled to a power source (e.g., a battery, a supercapacitor, etc.), such that the cart 102 moves autonomously and does not require being pushed or pulled by a human or other force. The cart 102 may travel to a charging area to charge its battery or batteries.

Referring still to FIG. 1A, the enhanced carts 102 may be configured to carry one or many similar or distinct storage containers 108, often in the form of totes or boxes, that can be used to hold one or more different products. These storage containers 108 may be removable from the enhanced cart 102. In some cases, each container 108 can be used as a separate picking location (i.e., one container 108 is a single order). In other cases, the containers 108 can be used for batch picking (i.e., each container 108 can contain multiple complete or partial orders). Each container 108 may be assigned to one or many different stations for post-pick sortation and processing. In one embodiment, one or more of the containers 108 are dedicated to batch picking of multiple types of products and another one or more containers 108 are dedicated to picking multiple quantities of a single product (e.g., for orders that only have one item). This singleton picking allows the warehouse to skip secondary sortation and deliver products directly to a packaging station. In another embodiment, one or more of the containers 108 are assigned to order picking (e.g., for potentially time sensitive orders) and one or more of the containers 108 are assigned to batch picking (e.g., for lower cost or less time sensitive orders). In yet another embodiment, one or more of the containers 108 carry product that will be used to re-stock product into storage locations. Another option is for the enhanced cart 102 to move product and/or shipments throughout the warehouse as needed between different stations, such as packing and shipping stations. In yet another implementation, one or more of the containers 108 is left empty to assist in counting product into and then back out of the container 108 as part of a cycle count task regularly carried out in warehouses for inventory management. The tasks may be completed in a mode dedicated to one task type or interleaved across different task types. For example, an associate 104 may be picking products into container "one" on the enhanced cart 102 and then be told to grab products from container "two" on the enhanced cart 102 and put them away in the same aisle.

Figure 1B:
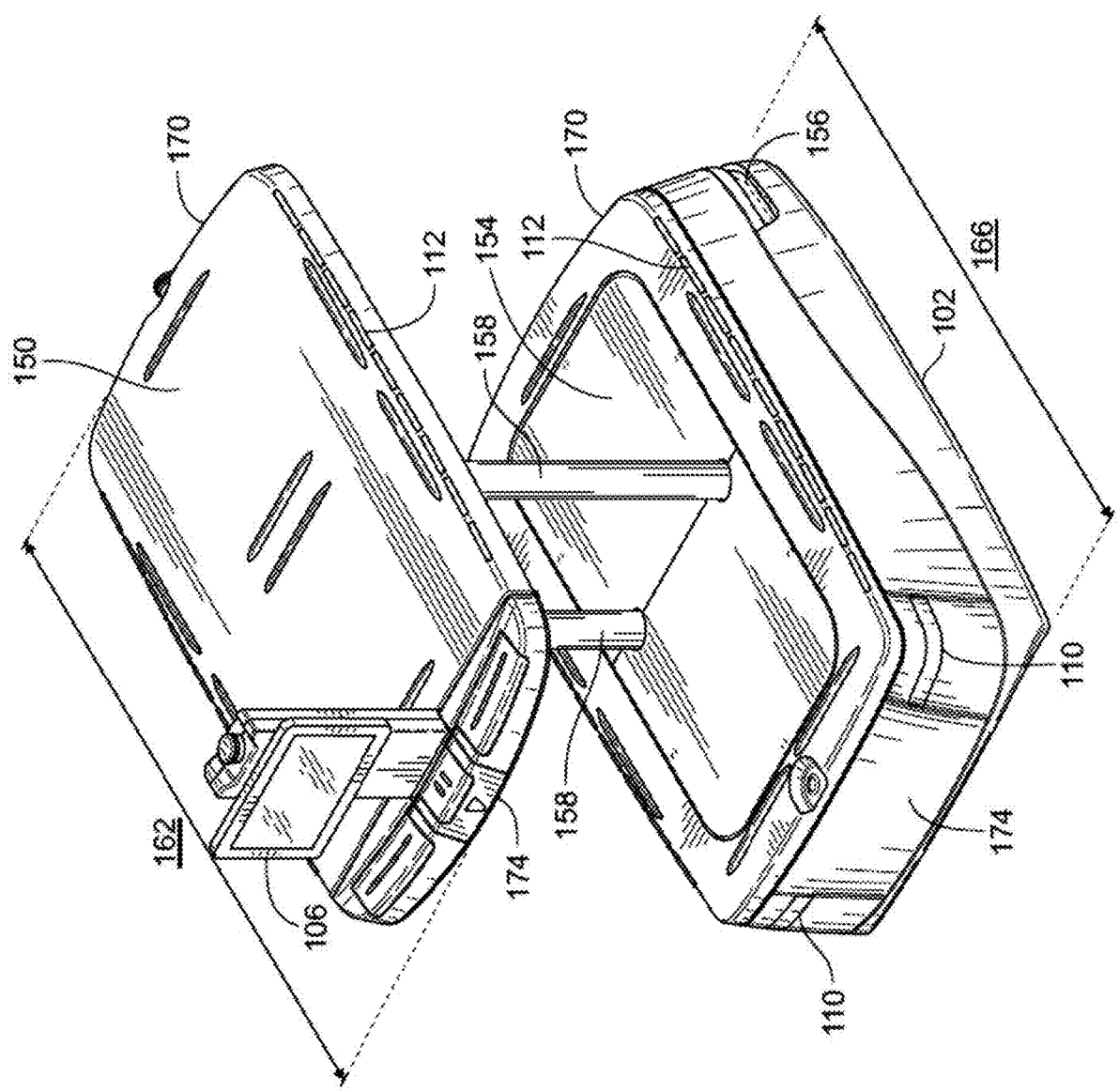
FIG. 1B is a model of another embodiment of an autonomous vehicle configured to collect items for orders.

FIG. 1B is an alternative embodiment of the enhanced cart 102, and is shown (for ease of understanding) without the storage containers 108 being present. As before, the enhanced cart 102 includes the screen 106 and lighting indicators 110, 112. In operation, the storage containers 108 may be present on the enhanced cart 102 depicted in FIG. 1B. With reference to both FIGS. 1A and 1B, the enhanced cart 102 may include first and second platforms 150, 154 for supporting a plurality of containers 108 capable of receiving products. At least one support 158 may support the first platform 150 above the second platform 154. The at least one support 158 may be substantially centrally-located along respective lengths 162, 166 of the first and second platforms 150, 154 between front and back ends 170, 174 thereof and may support the first and second platforms 150, 154 at locations disposed within interior portions of the first and second platforms 150, 154. As illustrated in FIG. 1B, the front end 170 of the cart 102 may define a cutout 156. There may be one or more sensors (e.g., light detecting and ranging sensors) housed within the cutout 156. The cutout 156 permits the sensor(s) to view and detect objects in front of and to the side of (e.g., more than 180° around) the cart 102.

The following discussion focuses on the use of autonomous vehicles, such as the enhanced cart 102, in a warehouse environment, for example, to assist with various warehouse-related tasks, including picking, re-stocking, carrying, moving, sorting, counting, or verifying inventory (e.g., products) or customer orders for shipping. However, autonomous vehicles of any type can be used in many different settings and for various purposes, including but not limited to: driving passengers on roadways, delivering food and medicine in hospitals, carrying cargo in ports, cleaning up waste, etc. This disclosure, including but not limited to the technology, systems, and methods described herein, is equally applicable to any such type of autonomous vehicle.

Product Demand

Demand for a product may change with one or more conditions, which may or may not be related to each other (e.g., correlated, caused by, etc.). In some instances, the conditions may be temporal, e.g., changing over the course of a week, month, quarter, year, etc. In some instances, the conditions may be seasonal, e.g., changing with weather, holidays, etc. In some instances, the conditions may be economical, e.g., changing with recessions, paycheck cycles (e.g., biweekly or monthly), etc. In some instances, the conditions may be based on marketing, e.g., sales, discounts, incentives, promotions, etc. In some instances, the conditions may be local, national, or global.

Data related to product demand and/or demand change may be received from third-party sources (e.g., market analyst data, marketing data, market survey data, government data, etc.) or collected by a particular merchant associated with the storage facility (e.g., owner or operator of the warehouse, retail store, grocery store, online store, etc.). In some cases, product demand and/or change thereof may be determined, calculated, derived, and/or predicted based on received data.

In some embodiments, the example systems described herein can determine the change in product demand by comparing customer order data for a given product in a previous day, week, month, year, etc. In some cases, the systems may compare product demand data of a given time period (e.g., a given day, week, month, quarter, etc.) of one or more previous years to the corresponding time period of the present year.

In some embodiments, the example systems described herein can predict demand in a particular product based on one or more indicators of demand including but not limited to: one or more discounts, sales, promotions, product views online, settings or configuration in an online store indicating an upcoming marketing/advertising/flash sale campaign, a flash sale, etc.

Note that the reception, collection, determination, and/or prediction of demand and/or change in demand may be executed entirely by a computing system described herein or shared between two or more separate computing systems (e.g., remote computing system(s), computing systems of one or more autonomous vehicles, off-site computing systems, cloud computing systems, etc.).

Computing Systems for Dynamic Repositioning Items

Figure 2:
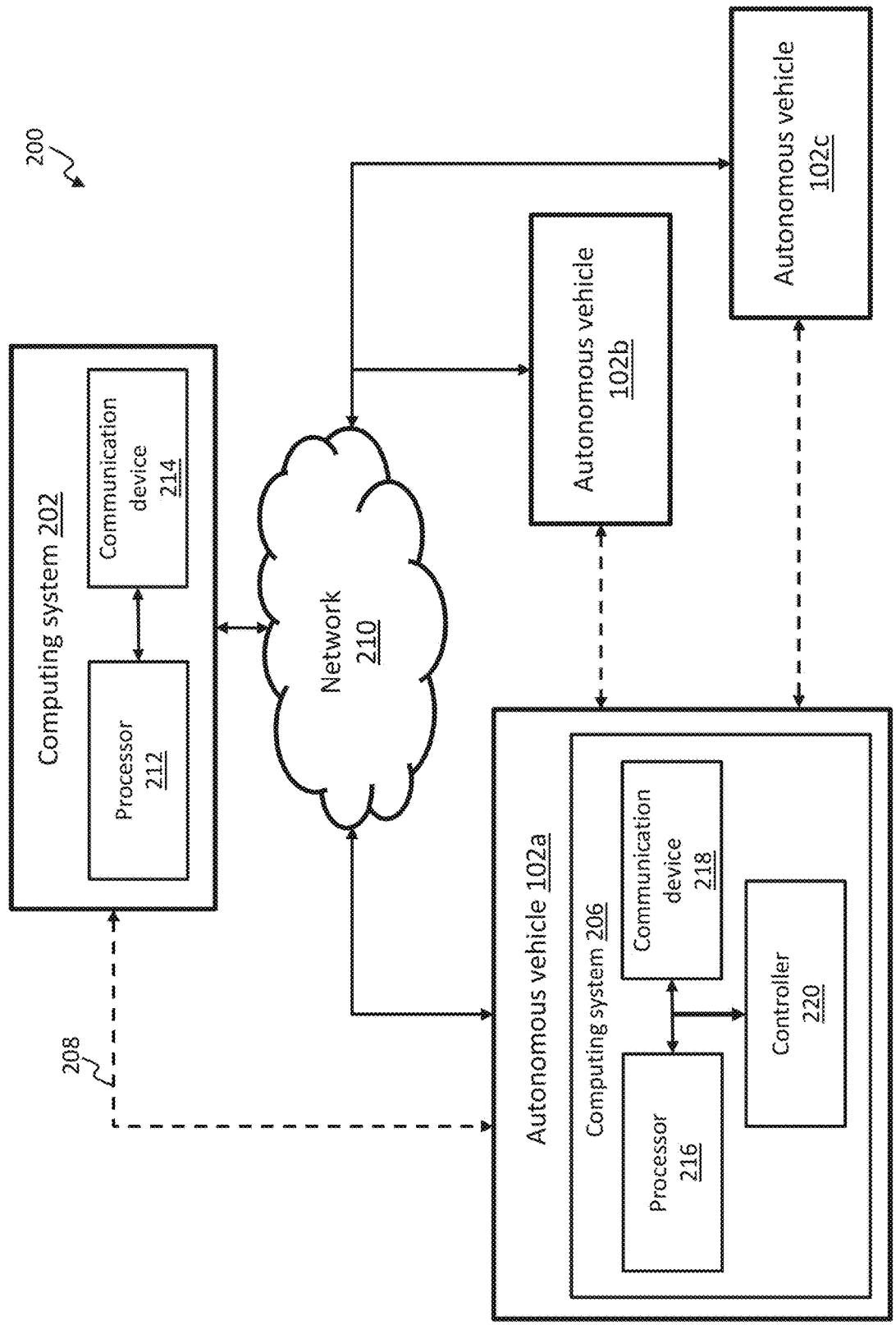
FIG. 2 is a diagram of an embodiment of one or more computing systems configured for repositioning items with autonomous vehicles.

FIG. 2 illustrates a system 200 configured to dynamically reposition inventory items within a space. The system 200 may include a (remote) computing system 202 configured to be coupled directly or indirectly to one or more autonomous vehicles 102a, 102b, 102c (collectively referred to as 102). For instance, the remote computing system 202 may communicate directly with the computing system 206 of an autonomous vehicle 102 (e.g., via communication channel 208). Additionally or alternatively, the remote computing system 202 can communicate with one or more autonomous vehicles 102 via a network device of network 210. In some embodiments, the remote computing system 202 may communicate with a first autonomous vehicle (e.g., vehicle 102a) via a second autonomous vehicle (e.g., vehicle 102b).

The exemplary remote computing system 202 may include a processor 212 coupled to a communication device 214 configured to receive and transmit messages and/or instructions. The exemplary vehicle computing system 206 may include a processor 216 coupled to a communication device 218 and a controller 220. The vehicle communication device 218 may be coupled to the remote communication device 214. The vehicle processor 216 may be configured to process signals from the remote communication device 214 and/or vehicle communication device 218. The controller 220 may be configured to send control signals to a navigation system and/or other components of the vehicle 102, as described further herein.

As discussed herein and unless otherwise specified, the term "computing system" may refer to the remote computing system 202 and/or the vehicle computing system 206. The computing system(s) may receive and/or obtain information about a customer order (e.g., from another computing system or via a network), including the list of items, the priority of the order relative to other orders, the target shipping date, whether the order can be shipped incomplete (without all of the ordered items) and/or in multiple shipments, etc. A processor (e.g., of system 202 and/or of system 206) may process the customer order to determine an optimal path for one or more autonomous vehicles 102 to collect items in a "picklist" for the order. For example, a picklist of items may be assigned to a single vehicle or to two or more vehicles 102.

The determined path may be transmitted to the controller 220 of the vehicle 102. The controller 220 may navigate the vehicle 102 in an optimized sequence of stops (also referred to as a trip) within the warehouse to collect the items. At a given stop, a worker near the vehicle 102 may physically place the item into a container 108 for the vehicle 102 to carry. Alternatively or additionally, the autonomous vehicle 102 may include an apparatus (e.g., a robotic arm) configured to collect items into a container 108.

Methods for Dynamically Repositioning Items

Figure 3:
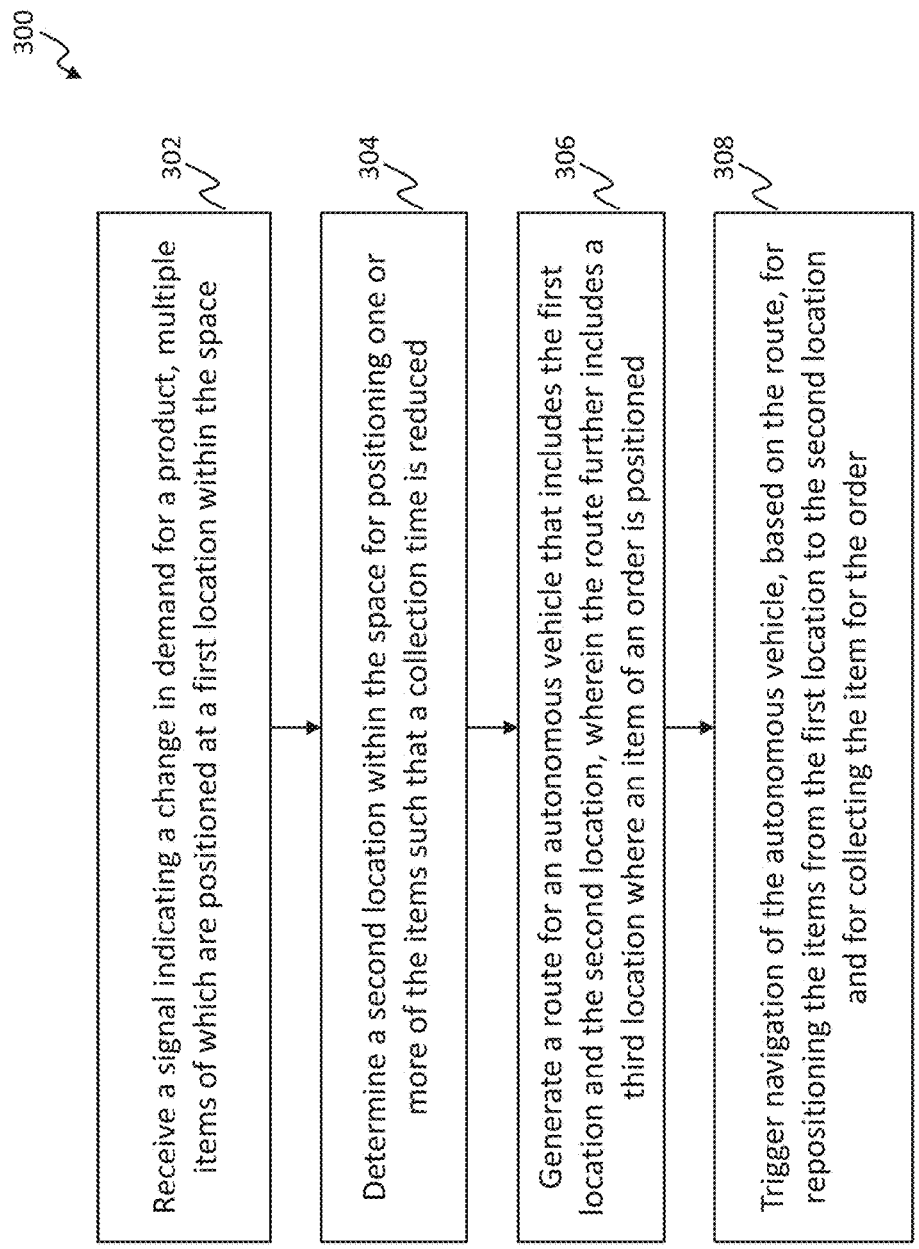
FIG. 3 is a flowchart of an embodiment of a method for dynamically repositioning items with autonomous vehicles.
Figure 4:
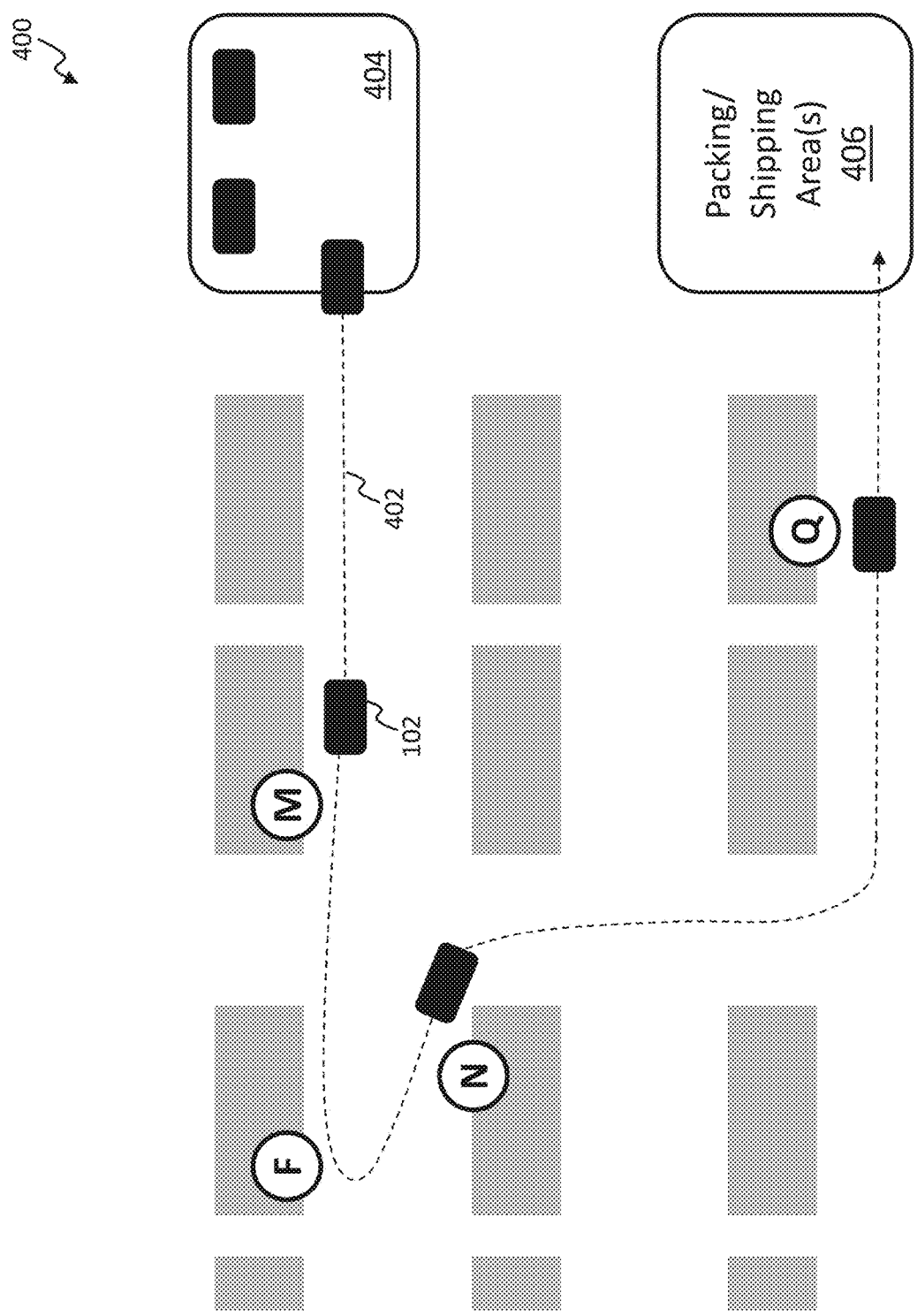
FIG. 4 is a diagram of an embodiment of a warehouse configuration in which one or more autonomous vehicles are employed to dynamically reposition items.

As discussed above, autonomous vehicles 102 can be navigated to dynamically reposition items in various settings based on demand data and/or while picking items for orders. FIG. 3 is a flowchart of an exemplary method 300 for dynamic repositioning of inventory items with one or more autonomous vehicles 102. FIG. 4 illustrates an exemplary warehouse configuration 400 in which one or more autonomous vehicles 102 are employed to reposition inventory. For the sake of clarity and conciseness, FIGS. 3-4 are discussed together herein.

In step 302, the computing system (e.g., a communication device thereof) may receive a signal indicating an instruction to reposition items of a product. In some embodiments, the signal may indicate a change in demand for a product. In some embodiments, the signal may indicate that a user of the computing system (e.g., a manager of an automated warehouse) has required or approved the repositioning of items. In some embodiments, the computing system (e.g., system 202 and/or system 206) may receive such a signal from any one or more of the following engines which may be coupled to or part of the computing system: (a) a warehouse slotting engine configured to manage inventory positioning (or slotting) within a warehouse; (ii) an order management engine configured to manage customer orders for inventory in the warehouse; and/or (iii) an inventory management engine configured to manage inventory items in the warehouse. For example, the order management engine may send a signal indicating that there is an increase or a decrease in the demand for a product in comparison to another time. In some embodiments, a processor of the computing system may determine a change in demand based on available data from one or more of the warehouse slotting engine, the order management engine, and/or the inventory management engine. In some implementations, the signal may be received via a computer network.

In some embodiments, the processor may transmit information related to the change in demand to a user interface. For example, the user interface may display (1) information indicating the increase or decrease in demand of a product, (2) information indicating a predicted performance impact (e.g., gain, loss, etc.) of the autonomous vehicle(s) and/or some or all of the automated warehouse, and/or (3) information indicating a recommendation to a user to approve the repositioning of the items. For instance, the user interface may provide such information related to one or more items for repositioned and may provide interface input options (e.g., buttons, check boxes, etc.) to approve one or more items for repositioning. In some embodiments, the user interface may include an input option (e.g., an "auto approve" check box) for the user to approve the automatic repositioning of items without further user input or involvement. In other words, once the user approves automatic repositioning, the computing system can proceed to automatically position items without requesting permission from a user. The user interface may include an option for the user to deselect the "auto approve" check box to revoke such permission, which can configure the processor to send information related to item repositioning to the user interface for user approval as described above.

Multiple items of the product (also referred to as an item type) may be positioned at a first location within the space (e.g., warehouse floor, retail floor, etc.). Referring to FIG. 4, the path 402 (depicted in a dashed line) of the vehicle 102 may take the vehicle 102 from a docking area 404 (e.g., charging area, parking lot, etc.) to one or more stops or locations (e.g., stop M, stop F, stop N, stop Q, etc.) throughout an inventory area (e.g., warehouse, grocery store, retail store, etc.) to collect items in the container 108, and may typically end at a packing and/or shipping area 406. For example, items of the product A may be positioned in a location M. Note that items for repositioning may be picked up by the autonomous vehicle 102 by a human picker and/or by a mechanical device (e.g., robotic arm). Such items may be picked up individually and placed into the container 108 or the bin or container that holds the items at its location may be picked up placed on the vehicle 102. As discussed herein, the repositioning of items may refer to repositioning of items individually, in groups, and/or by bins.

In some embodiments, repositioning (or re-slotting) of items may be analyzed or considered at various times or intervals (e.g., beginning or end of a work day, of a week, etc.). For example, the processor may analyze the orders (or a portion thereof) in a queue to be picked on a certain day and pre-determine the number and/or times for integrating repositioning tasks.

In step 304, the computing system (e.g., a processor thereof) may determine a second, different location within the space for positioning one or more items of the product at the first location. The computing system may determine such another location (e.g., location N) such that (1) the congestion level measured or predicted as a result of the change in demand is reduced at the first location (e.g., location M), (2) the congestion level measured or predicted at the first or second location doesn't exceed a threshold, and/or (3) there is an increase in speed (and/or reduction in time) with which items are collected with autonomous vehicles (e.g., throughout the warehouse, in a particular warehouse zone or aisle, etc.). For example, the level of congestion at location M or location N may be determined based on the number of vehicles 102 configured to be within a certain distance (e.g., a number of feet, a number of vehicle lengths 166, a number of rack lengths, etc.) of that location within a certain time (e.g., an hour, a half day, a work day, within 12 hours, within 24 hours, within three days, within a week, etc.). In another example, the level of collection speed may be determined based on a number of items (e.g., an average, a median, etc.) a vehicle 102 can collect over a period of time (e.g., an hour, a half day, a work day, within 12 hours, within 24 hours, within three days, within a week, etc.). In some embodiments, the congestion level or collection speed may be determined for a group of orders, for a group of vehicles or for the warehouse overall.

In some embodiments, the second location (e.g., location N) may be at least one vehicle length (e.g., length 166) away from the first location (e.g., location M). In some embodiments, the second location (e.g., location N) is selected based on a target congestion level for the first or second location (e.g. below a threshold) or based on a target collection speed. In some embodiments, the second location is the location of an item on the order list of the autonomous vehicle. For example, if an autonomous vehicle is tasked with both a repositioning task and a collection task, the vehicle may pick up a first set of items for repositioning at a first location and navigate to a second location to collect a second set of items for a customer order. At this second location, the vehicle may drop off (e.g., reposition) the first set of items and collect the second set of items for the customer order. This process may occur in the reverse order or in a mixed order. For example, the vehicle may collect a set (e.g., twenty (20)) items of a particular product at a first location, a first subset (e.g., eighteen (18)) of which is collected for repositioning to a second location and a second subset (e.g., two (2)) of which is stored on the vehicle for completing a customer order.

In some embodiments, the method 300 may include receiving a customer order for one or more items. These items may be included or organized into a picklist for one or more vehicles 102. In some embodiments, the computing system (e.g., a processor thereof) may monitor product demand and/or change in demand (as discussed in detail above). For instance, when the processor detects an increase in demand, the processor may determine a time or interval to integrate a repositioning task into a route for picking items. For example, repositioning tasks may be integrated at slower picking times. In some cases, a processor may integrate a repositioning task into the route of the next customer order in time or the next customer order with items of products located near the products for repositioning. For example, the processor may include the repositioning of product A at location M in a route for picking items at location F because locations M and F are relatively close positioned. By contrast, the processor may choose not to include picking items at location Z if neither location M (pick up) nor location N (drop off) are near location Z.

In step 306, the computing system (e.g., a processor thereof) may generate a route for at least one autonomous vehicle 102 that includes the first location (e.g., location M) and the second location (e.g., location N). In some embodiments, the route can include a third location (e.g., location F, location Q, etc.) where one or more items for a customer order are positioned. The route for repositioning items can include collecting one or more items (e.g., other than the repositioned items) for one or more customer orders. This may be referred to as an integrated route. For example, an integrated route that includes the repositioning of items of product A (e.g., from location M to location N) can include the collection of items of product C (at location F) and two items of product D (at location Q) for a customer order. In this way, by interleaving repositioning and collection tasks of autonomous vehicles 102, the efficiency of the warehouse operations may be increased. In particular, any unused time or resources (e.g., charge, fuel, etc.) that vehicles 102 spend traveling from one location to another location in a warehouse can be filled with repositioning and/or collection activities.

In some embodiments, a route for the vehicle 102 may be reconfigured and/or regenerated while the vehicle 102 is on the route. For example, the vehicle 102 may be navigating a route X for picking items (e.g., of product C at location F) for a customer order. At some point in the route X (e.g., between the beginning and end, after the docking area 404 and before the packing area 406, etc.), the route X may be reconfigured to include one or more repositioning tasks (e.g., reposition items of product A from location M to location N). In another example, the vehicle 102 may be navigating a route Y for repositioning items (e.g., of product A from location M to location N). At some point in the route Y, the route Y may be reconfigured to include one or more picking tasks for a customer order (e.g., picking items of product C at location F for a customer order).

In step 308, the computing system (e.g., a processor thereof) may trigger navigation of the autonomous vehicle 102, based on the route (e.g., integrated route 402), for repositioning the items from the first location to the second location and for collecting other item for the order. For example, processor 212 of remote computing system 202 may generate the route 402 and communication device 214 may transmit the route to a communication device 218 of an autonomous vehicle 102a. The controller 220 may navigate the vehicle 102a according to the prescribed route 402. In another example, processor 216 of the vehicle computing system 206 may generate the route 402 and send to controller 220 for navigating the vehicle 102a.

Figure 5:
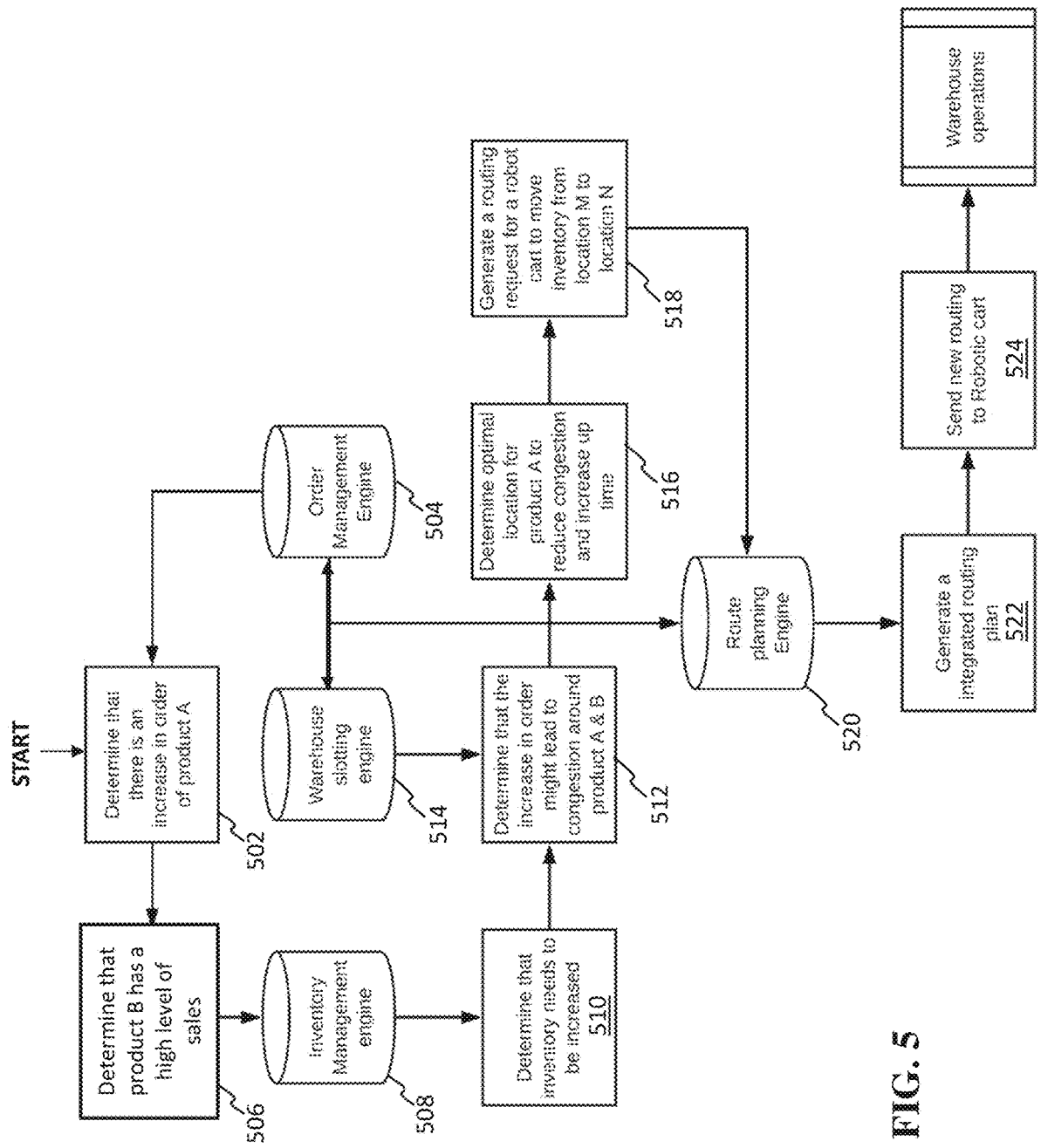
FIG. 5 is a diagram of an embodiment of a workflow for dynamically repositioning items with autonomous vehicles.

FIG. 5 illustrates an exemplary workflow 500 for an example of the dynamic repositioning of inventory items for two or more products (e.g., product A and product B) in a space. The two or more products may be located in different locations in a space and may be repositioned to two different locations. As discussed above, the route for repositioning for two or more products may be integrated with a route for picking items for a customer order.

In workflow process 502, the computing system (e.g., a processor) may determine that there is an increase in the customer orders of product A at location M based on information from the order management engine 504. In workflow process 506, the computing system (e.g., a processor thereof) may determine that product B (different from product A and located at location L) is a product with high level of sale volume. In some embodiments, the high level of sale volume in the sales of product B may be correlated or caused at least in part by the increase in the order of product A. The high sale level of product B may be fed to the inventory management engine 508 which, in workflow process 510, may determine that inventory for product A and/or product B should be increased.

In workflow process 512, with input from the warehouse slotting engine 514, the computing system (e.g., a processor thereof) may determine and/or predict that the increase in demand for product A and/or product B may lead to congestion at or near the locations of items of product A and/or product B. For example, the processor may determine and/or predict the increase in demand based on the techniques described above under heading "Product Demand".

In workflow process 516, the computing system (e.g., a processor thereof) may determine a different location (a location N different from its current location M) for product A. In some embodiments, the computing system may also determine a different location for product A. In workflow process 518, the computing system (e.g., a processor thereof) may generate a routing request for one or more autonomous vehicle(s) 102 to move the items from location M to location N. The communication device of the computing system may transmit this routing request to the route planning engine 520. For example, if there are more items at the location M than there is space on a given autonomous vehicle 102, one or more vehicles 102 (e.g., in a caravan) may be routed to location M to assist in repositioning items.

In workflow process 522, the route planning engine 520 may generate a route for one or more autonomous vehicles 102 to reposition items of product A and/or product B. In workflow process 524, the computing system 202 (e.g., a communication device 214 thereof) may transmit the integrated route to the autonomous vehicle 102 (e.g., to a communication device 218 of the computing system 206.

Computer-Based Implementations

In some examples, some or all of the processing described above can be carried out on a personal computing device, on one or more centralized computing devices, or via cloud-based processing by one or more servers. In some examples, some types of processing occur on one device and other types of processing occur on another device. In some examples, some or all of the data described above can be stored on a personal computing device, in data storage hosted on one or more centralized computing devices, or via cloud-based storage. In some examples, some data are stored in one location and other data are stored in another location. In some examples, quantum computing can be used. In some examples, functional programming languages can be used. In some examples, electrical memory, such as flash-based memory, can be used.

Figure 6:
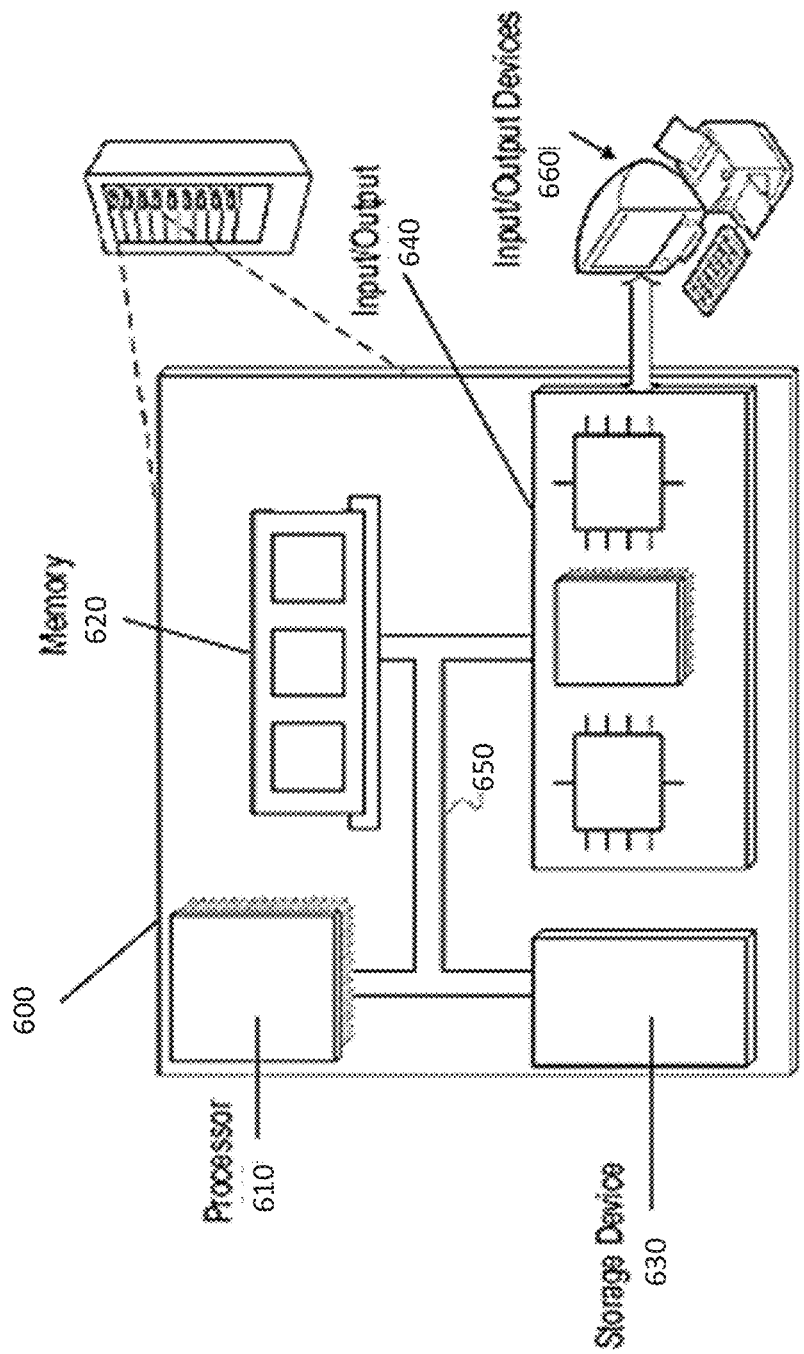
FIG. 6 is a block diagram of an embodiment of a computer system used in implementing the systems and methods described herein.

FIG. 6 is a block diagram of an example computer system 600 that may be used in implementing the systems and methods described herein. General-purpose computers, network appliances, mobile devices, or other electronic systems may also include at least portions of the system 600. The system 600 includes a processor 610, a memory 620, a storage device 630, and an input/output device 640. Each of the components 610, 620, 630, and 640 may be interconnected, for example, using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630.

The memory 620 stores information within the system 600. In some implementations, the memory 620 is a non-transitory computer-readable medium. In some implementations, the memory 620 is a volatile memory unit. In some implementations, the memory 620 is a nonvolatile memory unit.

The storage device 630 is capable of providing mass storage for the system 600. In some implementations, the storage device 630 is a non-transitory computer-readable medium. In various different implementations, the storage device 630 may include, for example, a hard disk device, an optical disk device, a solid-date drive, a flash drive, or some other large capacity storage device. For example, the storage device may store long-term data (e.g., database data, file system data, etc.). The input/output device 640 provides input/output operations for the system 600. In some implementations, the input/output device 640 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 660. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 630 may be implemented in a distributed way over a network, such as a server farm or a set of widely distributed servers, or may be implemented in a single computing device.

Although an example processing system has been described in FIG. 6, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

What is claimed is:

1. A system comprising:
    a communication device to receive a signal indicating a change in demand for a product, wherein a plurality of items of the product are positioned at a first location within a space;
    memory;
    machine-readable instructions; and
    at least one processor circuit in communication with the communication device, one or more of the at least one processor circuit to execute the machine-readable instructions to at least:
        determine a congestion level at the first location due to the change in demand;
        identify a second location within the space for repositioning at least a sub-plurality of the items of the product associated with the change in demand from the first location to cause at least one of the congestion level or a collection time to be reduced, the second location different from the first location, the collection time corresponding to a time for an autonomous vehicle to collect an item of the product associated with the change in demand;
        generate a route for a first autonomous vehicle that includes the first location and the second location, the route including a third location where an item of an order is positioned, the item of the order different than the sub-plurality of the items of the product associated with the change in demand; and
        cause the first autonomous vehicle to navigate, based on the route, to (a) reposition the at least the sub-plurality of the items of the product associated with the change in demand from the first location to the second location and (b) collect the item of the order at the third location.

2. The system of claim 1, wherein one or more of the at least one processor circuit is to determine the collection time when the plurality of items of the product associated with the change in demand are positioned at the first location based on at least one of:
    (i) the congestion level at the first location;
    (ii) a degree to which an item of another product is collected for a customer order, the customer order including an item of the product associated with the change in demand; or
    (iii) a collection frequency of an item of the product associated with the change in demand at the first location.

3. The system of claim 2, wherein one or more of the at least one processor circuit is to determine the collection time when the plurality of items of the product associated with the change in demand are positioned at the first location based on the congestion level at the first location, one or more of the at least one processor circuit to compare an average congestion level of the first location to an average congestion level of at least one other location in the space, the at least one other location in the space including the second location.

4. The system of claim 1, wherein the congestion level at the first location depends, at least in part, upon at least one of: (i) a number of autonomous vehicles near or at the first location at a given time or (ii) a number of workers near or at the first location at the given time.

5. The system of claim 1, wherein the congestion level at the first location is a predicted congestion level and wherein the predicted congestion level at the first location depends, at least in part, upon at least one of: (i) a predicted number of autonomous vehicles near or at the first location at a future time or (ii) a predicted number of workers near or at the first location at the future time.

6. The system of claim 1, wherein the third location is different from both the first location and the second location.

7. The system of claim 1, wherein the third location is the same as the first location or the second location.

8. The system of claim 1, wherein the sub-plurality of the items of the product associated with the change in demand is a first sub-plurality and one or more of the at least one processor circuit is to communicate with a second autonomous vehicle configured to carry a second sub-plurality of the items of the product associated with the change in demand.

9. The system of claim 1, wherein one or more of the at least one processor circuit is to cause the first autonomous vehicle to carry the item of the order in a container separate from a container holding the sub-plurality of the items of the product associated with the change in demand that are to be repositioned from the first location.

10. The system of claim 1, wherein the communication device is to receive, prior to one or more of the at least one processor circuit generating the route for the first autonomous vehicle, a signal indicating reception of the order from a customer.

11. The system of claim 1, wherein the congestion level at the first location is one of a measured congestion level or a predicted congestion level.

12. A method comprising:
receiving a signal indicating a change in demand for a product, wherein a plurality of items of the product are positioned at a first location within a space;
determining, by at least one processor circuit programmed by at least one instruction, a congestion level at the first location due to the change in demand;
identifying, by one or more of the at least one processor circuit, a second location within the space for repositioning at least a sub-plurality of the items of the product associated with the change in demand from the first location to cause at least one of the congestion level or a collection time to be reduced, the second location different from the first location, the collection time corresponding to a time for an autonomous vehicle to collect an item of the product associated with the change in demand;
generating, by one or more of the at least one processor circuit, a route for a first autonomous vehicle that includes the first location and the second location, the route including a third location where an item of an order is positioned, the item of the order different than the sub-plurality of the items of the product associated with the change in demand; and
causing, by one or more of the at least one processor circuit, the first autonomous vehicle to navigate, based on the route, to (a) reposition the at least the sub-plurality of the items of the product associated with the change in demand from the first location to the second location and (b) collect the item of the order at the third location.

13. The method of claim 12, further including determining the collection time when the plurality of items of the product are positioned at the first location based on at least one of:
(i) the congestion level at the first location;
(ii) a degree to which an item of another product is collected for a customer order, the customer order including an item of the product associated with the change in demand; or
(iii) a collection frequency of an item of the product associated with the change in demand at the first location.

14. The method of claim 13, wherein determining the collection time when the plurality of items of the product associated with the change in demand are positioned at the first location is based on the congestion level at the first location, and further including comparing an average congestion level of the first location to an average congestion level of at least one other location in the space, the at least one other location in the space comprising the second location.

15. The method of claim 12, wherein the congestion level at the first location depends, at least in part, upon at least one of: (i) a number of autonomous vehicles near or at the first location at a given time or (ii) a number of workers near or at the first location at the given time.

16. The method of claim 12, wherein the congestion level at the first location is a predicted congestion level and wherein the predicted congestion level at the first location depends, at least in part, upon at least one of: (i) a predicted number of autonomous vehicles near or at the first location at a future time or (ii) a predicted number of workers near or at the first location at the future time.

17. The method of claim 12, wherein the third location is different from both the first location and the second location.

18. The method of claim 12, wherein the third location is the same as the first location or the second location.

19. The method of claim 12, wherein the sub-plurality of the items of the product associated with the change in demand is a first sub-plurality and further including communicating with a second autonomous vehicle configured to carry a second sub-plurality of the items associated with the change in demand.

20. The method of claim 12, further including instructing the first autonomous vehicle to carry the item of the order in a container separate from a container holding the sub-plurality of the items of the product associated with the change in demand that are to be repositioned from the first location.

21. The method of claim 12, wherein the congestion level at the first location is one of a measured congestion level or a predicted congestion level.

22. A non-transitory computer-readable medium comprising machine-readable instructions to cause at least one processor circuit to:
responsive to a signal indicating a change in demand for a product,
determine a congestion level in a space including the product, the congestion level associated with the change in demand;
identify a second location within the space for repositioning at least a sub-plurality of items of the product associated with the change in demand from a first location in the space to cause at least one of the congestion level or a collection time to be reduced, the second location different from the first location, the collection time corresponding to a time for an autonomous vehicle to collect an item of the product associated with the change in demand;
generate a route for a first autonomous vehicle that includes the first location and the second location, the route including a third location where an item of an order is positioned, the item of the order different than the sub-plurality of the items of the product associated with the change in demand; and
cause the first autonomous vehicle to navigate, based on the route, to (a) reposition the at least the sub-plurality of the items of the product associated with the change in demand from the first location to the second location and (b) collect the item of the order at the third location.

23. The non-transitory computer-readable medium of claim 22, wherein the congestion level at the first location is one of a measured congestion level or a predicted congestion level.

* * * * *